United States Patent [19]

Ferrie

[11] 3,927,376

[45] Dec. 16, 1975

[54] SPEAKER MUTING SYSTEM

[75] Inventor: Ronald Gilbert Ferrie, Pittsburgh, Pa.

[73] Assignee: RCA Corporation, New York, N.Y.

[22] Filed: Dec. 23, 1974

[21] Appl. No.: 536,004

[52] U.S. Cl. .................................. 325/478; 325/64
[51] Int. Cl.$^2$ .......................................... H04B 1/10
[58] Field of Search ........... 325/478, 348, 402, 456, 325/403, 55, 64, 65; 179/1 VC, 2 B, 2.5 R, 3, 4, 2 DP, 15 BY

[56] References Cited

UNITED STATES PATENTS

| | | | |
|---|---|---|---|
| 3,613,004 | 10/1971 | Wycoff | 325/55 |
| 3,614,317 | 10/1971 | Benowitz | 325/478 X |
| 3,631,345 | 12/1971 | Wycoff | 325/64 X |
| 3,714,575 | 1/1973 | Rogalski | 325/55 X |
| 3,758,860 | 9/1973 | Braun | 325/55 X |

*Primary Examiner*—Albert J. Mayer
*Assistant Examiner*—Robert Hearn
*Attorney, Agent, or Firm*—Edward J. Norton; Robert L. Troike

[57] ABSTRACT

The loud speaker of a receiver is muted during the reception of data signals at a given tone in the voice band by providing a first control signal in response to the reception at the receiver of all audio frequency signals above a given level and by providing a second control signal upon the reception at the receiver of the data signals at the given tone above a given level. The audio output from the detector of the receiver is fed to the loud speaker in the presence of the first control signal only, with the loud speaker being muted in the presence of the second control signal only.

10 Claims, 3 Drawing Figures

SPEAKER MUTING SYSTEM

BACKGROUND OF THE INVENTION

This invention relates to data transmission on mobile radio or similar portable radio apparatus which normally communicates voice signals and more particularly to the suppression of audio interference which can arise in such apparatus from data signaling.

Because mobile radio and similar portable radio systems such as used by police, taxi cabs, etc., are generally operated in the minimum audio bandwidth necessary for speech intelligibility, it is not possible to use frequency division and separation filters to isolate data signaling from the normal voice transmission. Data transmissions required in police, fire, bus, taxi and other commercial or industrial radio systems are keyed on carrier tone at frequencies favorable for transmission within the audible audio band. To minimize interference, these transmissions are made as short as possible. They are limited in duration to two seconds by the Rules of the Federal Communications Commission.

In order to maximize the amount of information contained in such bursts, the data signaling is fully modulated and preempts the transmitter capacity from the voice use during the transmission. The result is that such data transmissions will be heard in the loud speakers of all mobile radio units in the system at a high audio volume. This sound is considered to be a major nuisance and disadvantage to the application of vehicular data systems.

While mobile telephone systems have used data signaling, the unit subscriber stations are generally "on hook" with the telephone handset until data signaling transmissions are completed. Both because there is no loudspeaker (an ear piece only) and because there is no audio monitoring until the data transmissions are completed, these systems generally do not bear on the problem to which the present invention is applied.

On a few existing radio data systems, use is made of subaudible tone squelch to prevent this interference. When the data tone is present, logic circuits inhibit the transmission of the subaudible tone, and thus appropriately equipped receivers remain muted during the data transmission. There are two important difficulties with this technique. First, the response time when subaudible tone is restored is unspecified in existing systems, and will generally be between 100 and 400 milliseconds. This interval is one during which the speaker of mobile units remain muted even though there is no objectionable data transmission present. This small interval of time during which communication is lost is highly objectionable in fast action communications systems such as those of taxi dispatchers. Moreover, this interval is about the same duration as the data messages, and therefore can greatly increase the time loss from data in a way that cannot be materially improved by speeding up the data transmission rate.

A further limitation of this approach is that the control leads for tone squelch circuits are generally internal to the transmitter-receiver unit and highly individualized, electrically, to particular models and manufacture of radios. This approach is very difficult to implement if a common type of data unit is to be retro-fitted in a radio system with many different types of radio equipment. The control leads required are frequently not available in the cable to the radio transmitter-receiver unit, in addition to the problem of electrical incompatabilities encountered.

BRIEF DESCRIPTION OF INVENTION

Briefly, the muting of a loud speaker of a receiver during data transmissions is provided by detecting the presence of all audio frequency intelligence signals over a time period to provide a first control signal and by detecting the presence of a signal at or very near the data tone frequency, which is within the audio band of frequencies, over a time period to provide a second control signal. A control circuit responsive to the first and second control signals activates the speaker when the first control signal only is provided to the control circuit and acts to mute the speaker when the initially received control signal is only the second control signal.

DETAILED DESCRIPTION

A detailed description follows in conjunction with the following drawing wherein.

Figure 1:
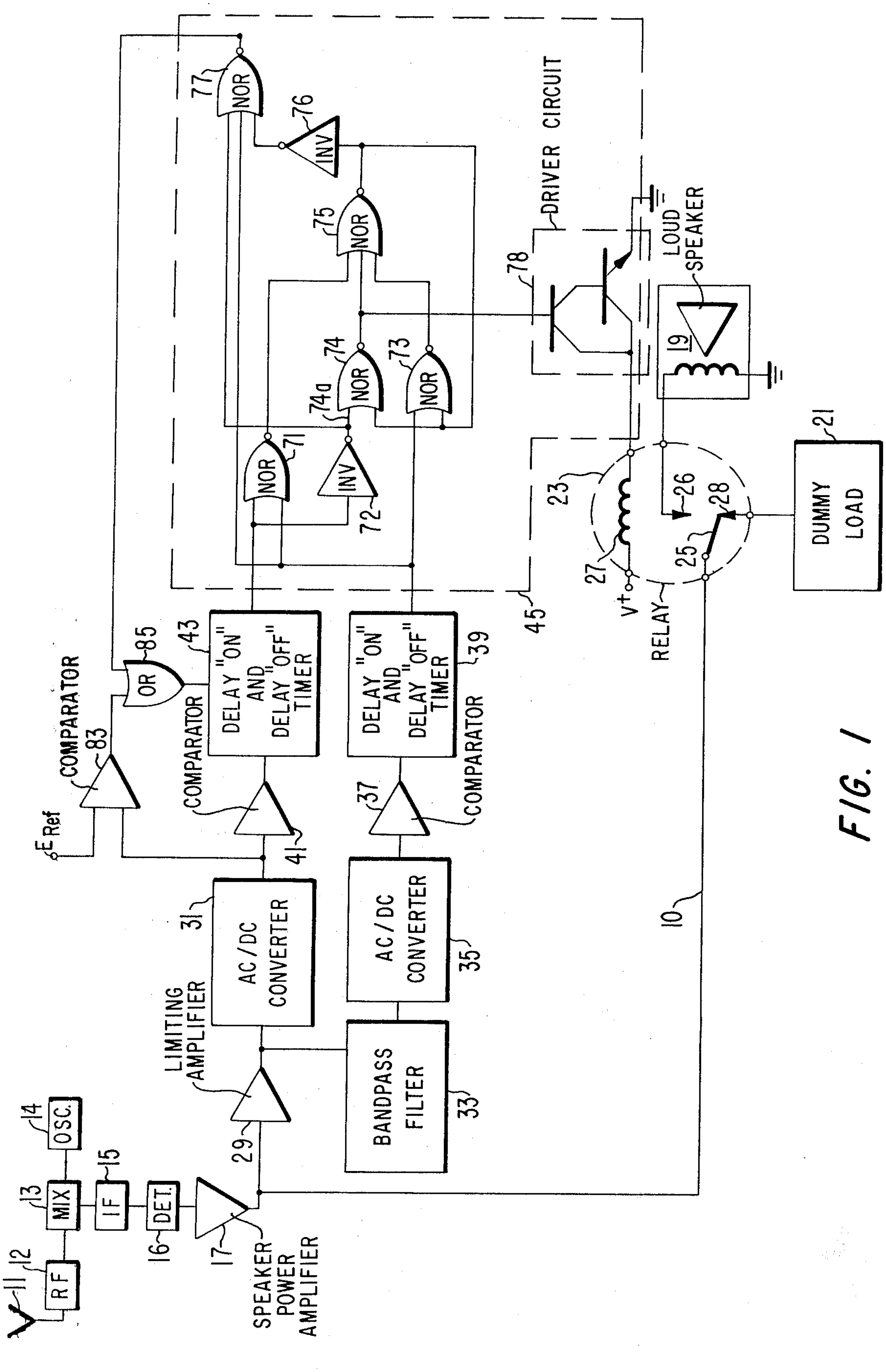
FIG. 1 is a block diagram of one emboidment of the present invention.

Referring to FIG. 1, radio frequency (RF) signals over a given frequency range are picked up by antenna 11 and are amplified by RF amplifier 12. The amplified radio frequency signals are applied to mixer 13. At the mixer 13, the RF signals are heterodynel with the local oscillator signals from oscillator 14 to provide intermediate frequency (IF) signals to IF stages 15. The IF signals at stage 15 are amplified and may be converted to even lower IF frequency signals. The output from IF state 15 is applied to audio detector 16. The detected audio frequency output signals include both voice signals and audio data signals. The audio data signal is characterized by a tone in the voice band of frequencies. In one preferred arrangement described herein, the data message comprises a series of marks (logic "one") and spaces (logic "zero") with 180° phase shift of a 1200 cps tone over a bit time period indicative of a space information bit and no phase shift of this tone over a bit time period indicative of a mark information bit. In this particular arrangement the bit time period is four cycles. The detected audio signals are applied via a speaker power amplifier 17, lead 10 and relay 23 to loud speaker 19. In the arrangement illustrated in FIG. 1, a speaker control system is coupled between power amplifier 17 and relay 23 for muting the speaker except during the reception of voice signals so as to prevent the annoying sounds associated with data signals from reaching the speaker. The audio output from power amplifier 17 is normally coupled to a dummy load 21 via lead 10 and relay 23. The switch arm 25 in relay 23 is normally connected to load 21 via terminal 28. Energization of the coil 27 in relay 23 causes the output from the power amplifier 17 to be applied to the speaker 19 via terminal 26.

Energization of the coil 27 is dependent upon the speaker control system coupled between amplifier 17 and coil 27 of the relay 23. Whenever an audio signal is present at the output of the amplifier 17, it is amplified and limited by limiting amplifier 29. The amplitude limited output is applied over a first path to AC/DC converter 31 and over a second path to band pass filter 33. The filter 33 is arranged to pass only signals at a data message frequency such as the 1200 cps tone in this particular example. This frequency is in the voice band of frequencies. The filter 33 may be designed to have a Q of 25 at this frequency and pass the tone at 1200 cps ± 24 cps. If such a tone is present indicating the presence of a data message, the tone signal is passed by the filter 33 and rectified by AC/DC converter 35. The DC (direct current) output from the converter 35 is compared to a reference DC level at comparator 37 and, if it exceeds the reference DC level, a logic "one" level signal is applied to timer 39. The presence of any audio frequency signal at AC/DC converter 31 provides a DC output to comparator 41. If the DC output from converter 31 exceeds a DC reference level, a logic "one" level signal is applied to timer 43. The comparators 37 and 41 may for example be saturable amplifiers such that when the input thereto is below 1.5 volts the output is zero, and if the input exceeds the reference level of 1.5 volts the output is 10 volts regardless of the input level above 1.5 volts. This arrangement provides a digital signal output with a "zero" being at ground potential and a "one" at about 10 volts.

Figure 2:
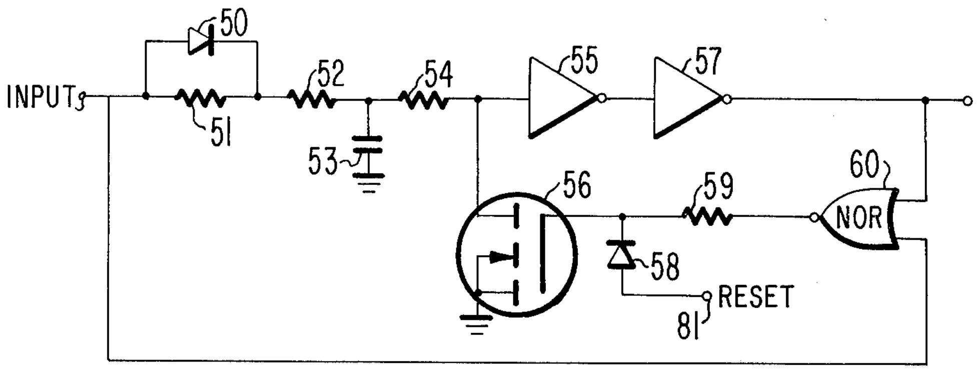
FIG. 2 is a schematic diagram by way of of the timers used in the embodiment of FIG. 1.

The two timers 39 and 43 may be like the timer shown in FIG. 2. The amplifiers 55 and 57 is FIG. 2 are inverting amplifiers that have a switching threshold which is about 50 percent of the applied voltage. These amplifiers may be RCA CA3600 COS/MOS devices that are sold by RCA Corporation, Solid State Division, Somerville, New Jersey. When the input signal changes from zero volts to +10 volts, no change appears at the output of the timer until capacitor 53 charges to about 5 volts through resistor 52 and diode 50. Note, however, that capacitor 53 continues to charge to +10 volts. After the input has been at +10 volts long enough for capacitor 53 to charge to about +5 volts, the output switches from zero to +10 volts. Since it takes time for capacitor 53 to charge up to the +5 volts, the tone or voice must be present for a time period sufficient for capacitor 53 to charge to the +5 volts. This time period may for example by 150 milliseconds. The tone passed through the bandpass filter 33 must therefore be present over this time period to provide any output from timer 39.

When the input signal returns to zero volts, capacitor 53 begins to discharge from +10 volts through resistors 51 and 52. When capacitor 53 has discharged to about +5 volts, the output switches to zero volts. A delay period therefore exists to turn "off" the output from the timer which is controlled by the discharge rate of capacitor 53. Note that the initial delay (delay to turn "on") was controlled by the time constant of resistor 52 and capacitor 53, and the final delay (delay to turn "off") is controlled by the time constant of resistors 51 and 52 and capacitor 53 so that the two delays can be controlled independently. Transistor 56 is used to discharge capacitor 53 quickly. Resistor 54 is very small and has little effect on the discharge rate. When both the input and output of a timer are at zero volts, capacitor 53 is discharged by field effect transistor 56 which is driven by NOR gate 60 coupled to the gate electrode of the transistor 56 via a resistor 59. Diode 58 is connected to an external reset terminal 81 and is used to reset the timer on demand.

The timers 39 and 43 are arranged such that timer 39 delay to turn "on" and provide an output logic signal in response to a sufficient level input signal is less than the delay for timer 43 to turn "on" and provide an output logic signal. The delay time to turn "off" timer 39 and provide a zero level output signal in response to the removal of a sufficient level input signal is selected to be the time length of the data message. The delay time to turn "off" timer 39 and provide a zero level output is less than that of timer 43. The outputs from timers 39 and 43 are applied to sequential logic 45.

This sequential logic 45 may be like that illustrated in the logic diagram of FIG. 1. The outputs from the timers in the above example are a logic "one" or about 10 volts when turned "on" and a logic "zero" or about ground potential when turned "off." The sequential logic 45 includes five NOR gates (71, 73, 74, 75 and 77) a pair of inverters (72 and 76) and a field effect transistor current driver circuit 78 for driving coil 27.

NOR gate 71 has two input terminals. One of these input terminals is coupled to the output of timer 39 and the other input terminal is coupled to the output of timer 43. NOR gate 73 likewise has two input terminals with one of its input terminals coupled to the output of timer 39. NOR gate 74 has two input terminals with one of its input terminals coupled via inverter 72 to timer 43. NOR gate 75 has three input terminals with a first of its input terminals coupled to the output of NOR gate 71, the second of its input terminals coupled to the output of NOR gate 73, and the third of its input terminals coupled to the output of NOR gate 74. The output from NOR gate 75 is coupled back to the second input terminal of NOR gates 73 and 74. NOR gate 77 has three input terminals with the first input terminal being coupled to the output of timer 39, the second input terminal being coupled via inverter 76 to the output of NOR gate 75, and the third input terminal being coupled to the output of inverter 72. The output of NOR gate 74 is also coupled via a current driver 78 to the coil 27 in relay 23.

Figure 3:
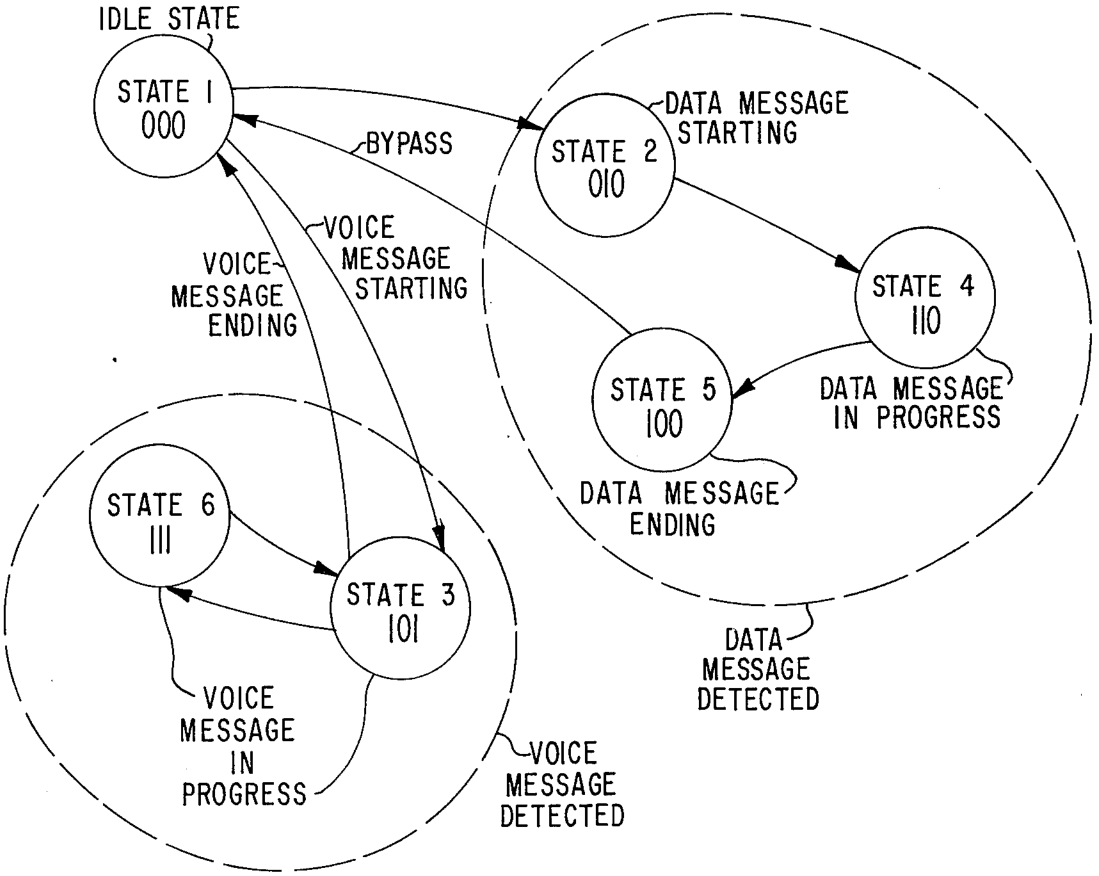
FIG. 3 is a state transition diagram for the operation of the system of FIG. 1.

The NOR gates are arranged such that the output is always a "zero" level unless all of the inputs are "zero" level inputs. If all of the inputs are at "zero" level, a logic "one" level (10 volt) is at the output. The operation of this logic circuit and the system will be explained with the aid of the state transition diagram of FIG. 3. Since typical mobile radio systems transmit the data (as an identity code or netting code) before the voice message, this order will be discussed.

In the idle state with no input signals being detected and applied to amplifier 17, the output from comparators 37 and 41 is a logic "zero" level and the outputs from timers 39 and 43 is a logic "zero". With zero level inputs to NOR gates 71 and 73, the output from both of these gates is a logic "one" level. These logic "one" levels from NOR gate 71 and 73 are applied to NOR gate 75 causing its output to be at logic level "zero".

The logic "zero" level from timer 43 is inverted through inverter 72 and a logic "one" level is applied to terminal 74*a* of NOR gate 74 providing a logic "zero" level out of NOR gate 74. With a "zero" level output from NOR gate 74, the relay 23 is not energized via coil 27 to connect the output from amplifier 17 to the speaker 19. The "zero" level output from NOR gate 75 is inverted by inverter 76 and applied as a logic "one" level to NOR gate 77 providing a logic "zero" level to timer 43 via OR gate 85 bypass at point B. This idle state is referred to as the 000 state in FIG. 3. The first number refers to the input to the sequential logic 45 from timer 43, the second number refers to the input to the sequential logic 45 from timer 39, and the third number refers to the output level to the relay 23 from NOR gate 74.

When a data message only is received, this audio tone is coupled through amplifiers 17 and 29 and applied to converter 33 and through bandpass filter 33 to converter 35. The DC output from both of the converters 31 and 35 produces a logic "one" level signal to timers 39 and 43. Since timer 39 has a shorter delay than timer 43, a logic "one" level is first provided out of timer 39. With a logic "one" level from timer 39 and a logic "zero" level from timer 43, the relay 23 remains de-energized. The NOR gate 71 with a logic "one" level from timer 39 provides a logic "zero" level to NOR gate 75. Similarly, NOR gate 73 provides a logic "zero" to NOR gate 75. The logic "one" level from inverter 72 provides a logic "zero" from NOR gate 74 and consequently a logic "one" level is provided from NOR gate 75. The logic "zero" level from inverter 76 together with the logic "one" levels from timer 39 and inverter 72 provide a logic "zero" level from NOR gate 77. The system is now in state 2 in the diagram of FIG. 4.

When the capacitor 53 of timer 43 reaches +5 volt (turn on delay time) a logic "one" level is applied to NOR gate 71 and to inverter 72. The output from NOR gate 74 remains at "zero" level and the output from NOR gate 71 remains at a logic "one" level. The output from NOR gates 75 and 77 remain the same. The system is now switched to state 4 indicated in FIG. 3. The system remains at state 4 for the remainder of the data message. The relay 23 has not been activated in any of these three states and, therefore, no signal is heard at the speaker. As soon as the phase reversals associated with the data message occur, the output from the bandpass filter 33 drops below the threshold of comparator 37 and the "off" delay period of timer 39 begins. This phase reversal causes the signal energy to be distributed over wide sideband frequencies with very little signal in the pass band of filter 33. Consequently, the filter output drops below the threshold. Since phase reversals occur frequently in a typical data message, the output from the bandpass filter for all practical purposes, remains below threshold for the entire data message. When the input to converter 37 drops below 1.5 volts, a logic "zero" level is applied to timer 39 which, in turn, causes timer 39 to provide a logic "zero" level output after the RC time period of capacitor 53 and resistors 51 and 52. See FIG. 2. This time period is fixed to the length of the data message. At the end of the "off" delay period, the output of timer 39 changes to logic "zero" and the circuit is in state 5. The "off" delay of timer 43 is made quite long to cover pauses in the voice conversation. The NOR gates 71, 73, 74 and 75 have the same outputs as the previous state 4 and the output to the relay 23 remains at "zero" level. The logic "zero" level at the output of timer 39 causes the output of NOR gate 77 to go to a logic "one" level. The logic "one" level from NOR gate 77 is coupled to terminal 81 of the timer in FIG. 2, for example, causing forward biasing of diode 58. The transistor 56 is forward biased via bias at the gate electrode and capacitor 53 is discharged quickly. The system returns to the idle state 1 with zero level outputs from timers 39 and 43 and logic "one" levels from the outputs of NOR gates 71 and 73.

When a voice message begins with initial frequencies outside of the bandpass of filter 33 over the time period to charge capacitor 53 to the 50 percent switching level of amplifiers 55 and 57, a logic "one" level is provided from timer 43 to NOR gate 71 and inverter 72. NOR gate 73 output remains at a logic "one" level to provide a logic "one" level input to NOR gate 75. The output from NOR gate 75 remains at a "zero" level. The "zero" level is fed back to NOR gate 74. The logic "one" level at inverter 72 provides the second logic "zero" level to NOR gate 74, causing a logic "one" level to be applied to current driver 78 and energization of relay 23 via coil 27. The current driver 78 provides sufficient current through coil 27 to cause a magnetic field strong enough to move switch 25 to break contact with terminal 28 and make contact with terminal 26, and to consequently make connection to the loudspeaker 19. The voice is then heard at the loudspeaker 19. This state is represented as state 3 in the diagram of FIG. 3. Sould the received voice signal contain a frequency component identical to the data tone frequency over the required time period and result in the timer 39 changing its output falsely to a logic "one" level, the system is not affected and the relay remains energized due to logic "zero" levels to NOR gate 74. This last state representing the reception of a tone sufficient to activate timer 39 during voice is represented by state 6 in the diagram of FIG. 3. Since the "off" time delay of timer 39 is less than that of voice timer 43, transitions from state 3 to state 6 always terminate at state 3. At the end of the voice message, the system remains at state 3 until the timer 43 "off time" delay is exhausted. When this occurs, the system returns to the idle state 1. At idle state 1, NOR gate 74 output returns logic to "zero" level removing the drive signal to coil 27 of relay 23 and allowing switch 25 which is normally biased to contact terminal 28 to switch back to terminal 28, disabling the speaker 19 and terminating the output in the dummy load 21. If at the end of the voice message, this message included a tone at the data frequency, the system would revert back to state 3 before the relay 23 was de-energized, because the "off" delay of timer 39 would be terminated before the "off" delay of timer 43.

Since timer 43 has a relatively long time delay before resetting to the "off" position, this delay prevents the system from being immediately ready to receive a new message. This delay of timer 43 is used to hold the loud speaker active while the talker pauses to take a breath and so forth. It is possible to determine when the talker at the remote transmitter is only pausing in the message and when he has released his push-to-talk switch by the magnitude of the signal at the output of the AC/DC converter 31. If there is a pause in the message, the microphone will still pick up ambient sounds that will produce a small signal. If the push-to-talk switch in the remote transmitter of conventional mobile equipment is released, the local receiver is "muted" (by the absence of a received carrier wave) and no signal appears at the AC/DC converter 31. The arrangement in FIG. 1 with comparator 83 and OR gate 85 solve the above problem using the above relationships. Comparator 83 is coupled to the output of AC/DC comparator 31 and to a source of reference potential $E_{Ref}$. The output of comparator 83 is coupled to one input of OR gate 85. The output of NOR gate 77 is coupled to a second input of OR gate 85. The output of OR gate 85 is coupled to the resetting terminal 81 of timer 43. If the signal at the output of converter 31 is insufficient to activate comparator 41 and comparator 83 (signal in is less than the voltage level $E_{Ref}$), comparator 83 will provide a logic "one" level through OR gate 85 to timer 43 to reset it immediately in the same manner as the bypass signal from gate 77 provides the logic "one" level through OR gate 85 to timer 43 causing resetting of the timer. If the signal from the AC/DC converter 31 is equal to or greater than the selected reference voltage $E_{Ref}$ such as to indicate a pause level signal input, the output from comparator 83 is "zero" level and the system operates as described previously.

What is claimed is:

1. In a receiver system including an audio detector to detect voice audio intelligence signals and data audio tone intelligence signals at a given frequency within the voice band of frequencies, and means to provide the receiver output to an audio speaker wherein said data signals cause highly objectional noise in the output of said speaker, the improvement therewith comprising:

first means coupled to the audio detector of said receiver for providing after a first time period a first control signal during the presence of either said voice audio intelligence signals or said data audio tone intelligence signals, second means coupled to the audio detector of said receiver for providing after a second time period a second control signal during the presence of signals at or very near said given frequency over a time period, and third means coupled to said speaker and responsive to said first and second control signals for coupling the output of said detector to said speaker in response to the initially received control signal at said third means being said first control signal only, and for muting said speaker in response to the initially received control signal at said third means being said second control signal only.

2. The combination of claim 1 wherein said second means includes a narrow bandpass filter centered at said given frequency.

3. The combination of claim 2 wherein said first means includes a first timed delay means and said second means includes a second timed delay means, and said first and second timed delay means have differing timed delays.

4. The combination of claim 3 wherein said first and second timed delay means have a timed delay to provide an output control signal after reception of sufficient level signal applied thereto and a time delay to remove the control signal after removal of that sufficient level signal.

5. The combination of claim 4 wherein said time delay of said second timed delay means is shorter than said time delay of said first timed delay means.

6. The combination of claim 5 including means coupled between said second timed delay means and said first timed delay means responsive to the termination of said second control signal for shortening the time delay of said first timed delay means.

7. The combination of claim 4 including means responsive to all of said audio signals received being below a given level for shortening the time delay of said first timed delay means.

8. A receiver system including an audio detector to detect voice audio intelligence signals and data audio tone intelligence signals at a given frequency within the voice band of frequencies, and means to provide the output of said detector to an audio speaker wherein said data signals cause highly objectional noise in the output of said speaker, said receiver further including;

amplitude limiting means coupled to the audio detector for amplitude limiting the alternating current signals from the audio detector, first converting means coupled to said audio limiting means for converting alternating current signals to direct current signals wherein the direct current level is dependent upon the amplitude of the alternating current signals, comparator means coupled to said first converting means for providing an output signal at a first given level when the input signal from said converting means exceeds a second given level, first timed delay means responsive to said signal at said first given level for first providing a first output control signal at a third given level at a first fixed time period following reception of said signal at said first given level and for removing said first control signal after a second fixed time period.

bandpass filter means coupled to said limiting means for passing only signals at or very near said given frequency, second converting means coupled through said filter means to said audio limiting means for converting alternating current signals to direct current signals wherein the direct current level is dependent upon the amplitude of the alternating current signals, second comparator means coupled to said second converting means for providing an output signal at said first given level when the input signal from said second converting means exceeds said second given level, second timed delay means responsive to said signal at said first given level from said second comparator means for providing a second output control signal at said third given level at a third fixed time period following reception of said signal at said first given level and for removing said second control signal after a fourth fixed time period, said third time period being shorter than said first time period and said fourth time period being shorter than said second time period, means coupled between said speaker and the output of said first and second timed delay means for coupling the output of said detector to said speaker in response to the initial reception thereby of said first control signal only, for muting said speaker for the duration of said data signals in response to the initial reception thereby of only said second control signal, and for removing the second fixed time period delay of said first timed delay means in response to removal of said second control signal.

9. The combination claimed in claim 8 wherein said second fixed time period of said first timed delay means is made long enough to prevent the removal of said first control signal during pauses in voice communications.

10. The combination claimed in claim 9 including third comparator means coupled to the output of said first converter means for when the input signal from said first converting means exceeds a fifth given level substantially lower than said second given level removing the second fixed time period delay of said first timed delay means.

* * * * *